(12) United States Patent
Tan

(10) Patent No.: US 8,589,684 B2
(45) Date of Patent: Nov. 19, 2013

(54) COMMUNICATION DEVICES AND METHODS

(75) Inventor: Zhenhua Tan, Shenyang (CN)

(73) Assignee: Northeastern University Technology Transfer Center, Shenyang (CN)

(*) Notice: Subject to any disclaimer, the term of this patent is extended or adjusted under 35 U.S.C. 154(b) by 377 days.

(21) Appl. No.: 12/727,062

(22) Filed: Mar. 18, 2010

(65) Prior Publication Data

US 2010/0241856 A1 Sep. 23, 2010

(30) Foreign Application Priority Data

Mar. 23, 2009 (CN) .......................... 2009 1 0080821

(51) Int. Cl.
*H04L 9/32* (2006.01)
(52) U.S. Cl.
USPC ........... 713/168; 235/375; 235/380; 235/492; 709/218; 709/219; 709/235; 375/240.08; 348/575
(58) Field of Classification Search
USPC .......................... 713/168; 235/375, 380, 492; 709/218–219, 235; 375/240.08; 348/575
See application file for complete search history.

(56) References Cited

U.S. PATENT DOCUMENTS 5,913,055 A * 6/1999 Yoshida et al. ............... 712/233
7,114,646 B2 * 10/2006 Hillhouse .................... 235/375

FOREIGN PATENT DOCUMENTS

CN 101105775 A 1/2008

* cited by examiner

*Primary Examiner* — Thanhnga B Truong
(74) *Attorney, Agent, or Firm* — Maschoff Brennan

(57) ABSTRACT

A communication device, method and network are provided. The communication method comprises generating a first registration packet including first bio data, sending the first registration packet to a network, generating a content packet having second bio data and content data and sending the content packet to the network. The other communication method comprises receiving a first registration packet including first bio data, storing the first bio data together with a device identification, receiving a content packet including second bio data, extracting the second bio data from the content packet, comparing the first bio data with the second bio data and authorizing communication when the first bio data matches the second bio data.

20 Claims, 5 Drawing Sheets

COMMUNICATION DEVICES AND METHODS

CROSS-REFERENCE TO RELATED APPLICATIONS

This application claims priority to Chinese Patent Application No. 200910080821.X, filed Mar. 23, 2009, which is incorporated herein by reference.

TECHNICAL FIELD

The disclosure relates to the field of network data communications.

BACKGROUND

At present, Peer-to-Peer (P2P) communication has attracted significant attention in the computer industry. Different from the traditional Client/Server (C/S) mode, each device in a P2P network in the P2P communication mode is peer to each other, which means the each device can serve not only as a server providing data service to another device, but also as a client utilizing the data service provided by another device. No matter P2P communication or C/S communication, a secured traffic among different devices is always worthwhile to be addressed.

SUMMARY

According to an aspect of the disclosure, there is provided a communication method, comprising generating a first registration packet including a first bio data; sending the first registration packet to a network; generating a content packet having a second bio data and a content data; and sending the content packet to the network.

According to another aspect of the disclosure, there is provided another communication method comprising receiving a first registration packet including a first bio data; storing the first bio data together with a device identification; receiving a content packet including a second bio data; extracting the second bio data from the content packet; comparing the first bio data with the second bio data; and authorizing communication when the first bio data matches the second bio data.

According to a further aspect of the disclosure, there is provided a communication device comprising a registration packet generation unit configured to generate a first registration packet including a first bio data; a content packet generation unit configured to generate a content packet having a second bio data and a content data; and a network communication unit configured to send the first registration packet and the content packet to a network.

According to a further aspect of the disclosure, there is provided another communication device comprising a network communication unit configured to receive a first registration packet including a first bio data and a content packet including a second bio data; a registration unit configured to store the first bio data together with a device identification; an extracting unit configured to extract the second bio data from the content packet; a communication validation unit configured to compare the first bio data with the second bio data and authorize communication when the first bio data matches the second bio data.

The foregoing is a summary and thus contains, by necessity, simplifications, generalization, and omissions of detail. Consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE FIGURES

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
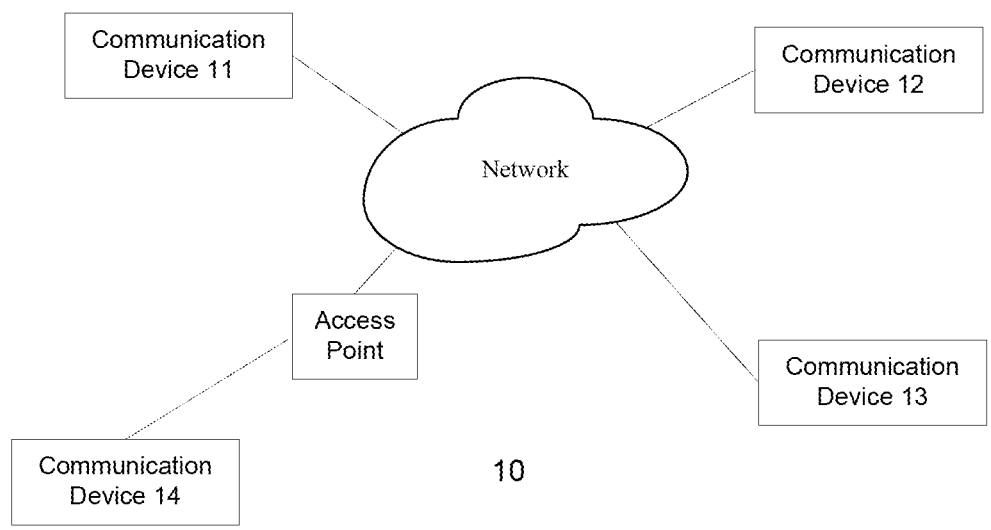
FIG. 1 is a schematic diagram illustrating a Peer-to-Peer (P2P) communication system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, devices, computer programs and systems related to communication technology.

Although the disclosure may use a Peer-to-Peer (P2P) communication system as an example, those skilled in the art should understand that the disclosure can apply to other communication systems such as client-and-server communication system.

FIG. 1 is a schematic diagram illustrating a P2P communication system 10. Referring to FIG. 1, the P2P communication system 10 includes several communication devices, such as communication devices 11, 12, 13, and 14. The communication devices 11-12 in the P2P communication system 10 are peers with each other. That is, each communication device can serve as a server providing data service to another communication device, and can also serve as a client utilizing the data service provided by another communication device. As illustrated in FIG. 1, the communication device can be connected to the network via wired communication or wireless communication by an access point, for example. The network shown in FIG. 1 can be any communication network such as LAN, WAN and internet.

In the P2P communication systems 10, the real identification of communication devices such as the IP address may be hidden. Therefore, a communication device 11-14 receiving data may not know the real source of the received data, which presents a risk of being attacked by malicious communication devices.

Figure 2A:
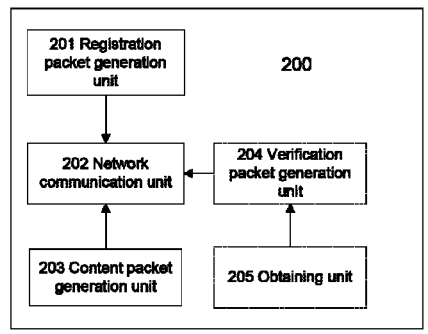
FIG. 2A is a schematic diagram illustrating a structure of a communication device according to an embodiment of the disclosure.

In view of this, an embodiment of the disclosure provides a communication device 200 as illustrated in FIG. 2A. The communication device 200 includes a registration packet generation unit 201, a network communication unit 202 and a content packet generation unit 203. Optionally, the communication device 200 may include a verification packet generation unit 204 and an obtaining unit 205.

The registration packet generation unit 201 is configured to generate a first registration packet including a first bio data, and can be further configured to generate a second registration packet including a fourth bio data. The content packet generation unit 203 is configured to generate a content packet having a second bio data and a content data. The obtaining unit 205 is configured to obtain a third bio data. The verification packet generation unit 204 is configured to generate a verification packet including the third bio data. The network communication unit 202 is configured to send the first registration packet and the content packet to a network, and can be further configured to send the verification packet to the network and to send the second registration packet to the network.

The first bio data or the second bio data includes one of bio characteristics, a biometric parameter derived from the bio characteristics, or an encoded biometric parameter. The third bio data includes one of bio characteristics, a biometric parameter derived from the bio characteristics, or an encoded biometric parameter. The fourth bio data includes one of a biometric parameter derived from a bio characteristics or an encoded biometric parameter. The bio characteristics include at least one of facial image, voice, fingerprint or iris pattern.

For example, the communication device 200 can be any device capable of network communication, such as PDA, desktop PC, laptop computer, mobile phone and the like.

As for the registration packet generation unit 201, the content packet generation unit 203, and the verification packet generation unit 204, they can be modules running in a processing unit or multiple processing units such as a CPU, FPGA and the like, for example. As for the network communication unit 202, it can be any device capable of sending traffic out, such as a NIC in a PC, a wireless communication module in a mobile phone or a laptop computer and the like. As for the obtaining unit 205, it can be any device capable of obtaining facial image, voice, fingerprint or iris pattern of a user of the communication device 200, such as a camera, a voice recorder, a fingerprint sensor or an iris pattern detector and the like.

Figure 2B:
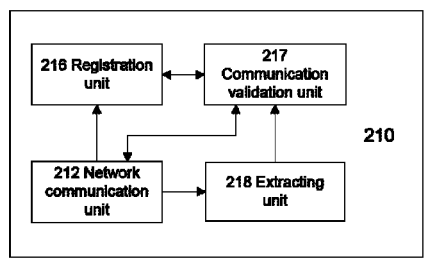
FIG. 2B is a schematic diagram illustrating a structure of a communication device according to another embodiment of the disclosure.

Another embodiment of the disclosure provides a communication device 210 as illustrated in FIG. 2B. The communication device 210 includes a registration unit 216, a communication validation unit 217, an extracting unit 218 and a network communication unit 212.

The network communication unit 212 is configured to receive a first registration packet including a first bio data and a content packet including a second bio data. The registration unit 216 is configured to store the first bio data together with a device identification. The extracting unit 218 is configured to extract the second bio data from the content packet. The communication validation unit 217 is configured to compare the first bio data with the second bio data and authorize communication when the first bio data matches the second bio data. The network communication unit 212 can be further configured to receive a verification packet including a third bio data, and the communication validation unit 217 can be further configured to compare the first bio data with the third bio data and authorize communication when the first bio data matches the third bio data. Furthermore, the network communication unit 212 can be further configured to receive a second registration packet including a fourth bio data, and the communication validation unit 217 can be further configured to generate a fifth bio data based on the first bio data, compare the fourth bio data with the fifth bio data and authorize the storing of the first bio data together with the device identification when the fourth bio data matches the fifth bio data.

The first bio data or the second bio data includes one of bio characteristics, a biometric parameter derived from the bio characteristics, or an encoded biometric parameter. The third bio data includes one of bio characteristics, a biometric parameter derived from the bio characteristics, or an encoded biometric parameter. The fourth bio data or the fifth bio data includes one of a biometric parameter derived from a bio characteristics or an encoded biometric parameter. The bio characteristics include at least one of facial image, voice, fingerprint or iris pattern.

For example, the communication device 210 can be any device capable of network communication, such as PDA, desktop PC, laptop computer, mobile phone and the like.

As for the registration unit 216, the communication validation unit 217, and the extracting unit 218, they can be modules running in a processing unit or multiple processing units such as a CPU, FPGA and the like, for example. As for the network communication unit 212, it can be any device capable of sending traffic out, such as a NIC in a PC, a wireless communication module in a mobile phone or a laptop computer and the like. As for the device identification stored with the first bio data by the registration unit 216, for example, it can be an IP (internet protocol) address of the device or any kind of identification capable to identify the device.

Figure 2C:
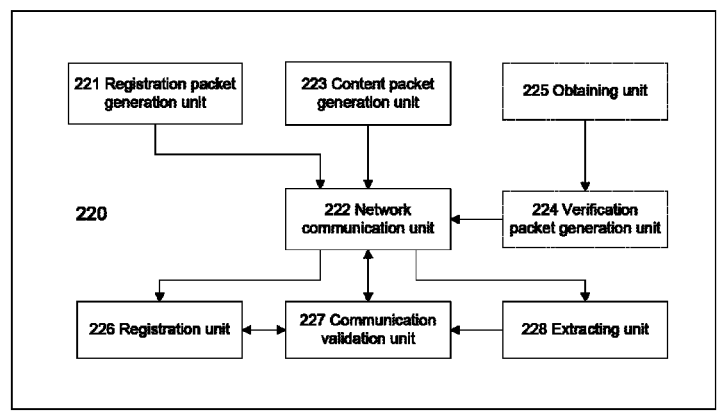
FIG. 2C is a schematic diagram illustrating a structure of a communication device according to a further embodiment of the disclosure.

Another embodiment of the disclosure provides a communication device 220 as illustrated in FIG. 2C. As shown by FIG. 2C, the communication device 220 includes some features from the communication device 200 and the communication device 210 having one network communication unit 222.

Next, a method of the disclosure is described in connection with FIG. 3. It is noted that the dotted circles in the figure denote optional steps that could be inserted there.

Figure 3:
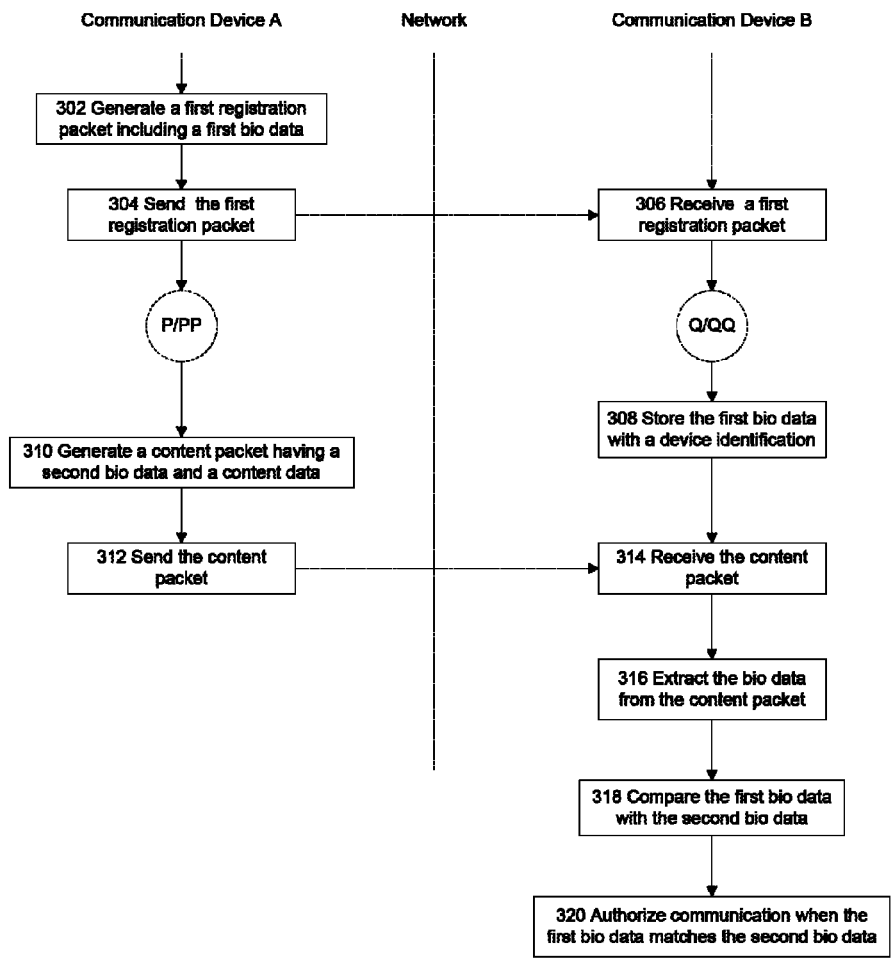
FIG. 3 is a schematic diagram illustrating a communication method according to an embodiment of the disclosure.

As illustrated in FIG. 3, a communication device A, such as the communication device 200, communicates with a communication device B such as the communication device 210 via a network. The skilled in the art should understand that the communication device A and the communication device B can be two communication devices like the communication device 220, since the communication device 220 can function as both the communication device 200 and the communication device 210.

According to step 302 of FIG. 3, the communication device A generates a first registration packet including a first bio data. The communication device A further sends the first registration packet to a network at step 304. Communication device B receives the first registration packet including the first bio data at step 306. At step 308, communication device B stores the first bio data together with a device identification. Furthermore at step 310, communication device A generates a content packet having a second bio data and a content data. In addition, the communication device A sends the content packet to the network at step 312. At step 314, the communication device B receives the content packet including the second bio data. At step 316, communication device B extracts the second bio data from the content packet. Further at step 318, the communication device B compares the first bio data with the second bio data, and at step 320 authorizes communication when the first bio data matches the second bio data.

As an example, the device identification stored with the first bio data by the registration unit 216 in the step 308 can be the IP address of the communication A. The content data in the content packet can be text data, audio data, video data, combination thereof or the like, for example. At the step 308, the registration unit 216 can store the first bio data and the device identification in any storage means such as RAM, flash memory, cache, hard drive and the like. For example, the registration unit 216 can establish and store a table/table item in the flash memory, in which the first bio data of the communication device A and the IP address of the communication device A are mapped. At the step 320, for example, the communication validation unit 217 of the communication device B can authorize communication by accepting the content packet and putting the same into an application in the communication device B for further processing such as decoding and reproducing video stream. And if the first bio data does not match the second bio data in the step S320, the communication validation unit 217 can discard the content packet and stop the same entering to other applications/modules of the communication B for further processing.

Another method of the disclosure is described in connection with FIG. 4. This embodiment can be supplemented with other embodiments described herein, for example the disclosure with respect to FIG. 3.

At step 402, the communication device A generates a second registration packet including a fourth bio data. Then, communication device A sends the second registration packet to the network at step 404. At step 406, the communication device B generates a fifth bio data based on the first bio data. Further at step 408, communication B receives the second registration packet including the fourth bio data. Then at step 410, communication device B compares the fourth bio data with the fifth bio data, and at step 412 authorizes the storing of the first bio data together with the device identification when the fourth bio data matches the fifth bio data.

A further method of the disclosure is described in connection with FIG. 5. This embodiment can be supplemented with other embodiments described herein, for example the disclosure with respect to FIGS. 3 and/or 4.

At step 502, communication device A obtains a third bio data. Then at step 504, the communication device A generates a verification packet including the third bio data. Then at step 506, communication device A sends the verification packet to the network. At step 508, communication device B receives the verification packet including the third bio data. Then at step 510, communication device B compares the first bio data with the third bio data, and at step 512 authorizes communication when the first bio data matches the third bio data.

Figure 4:
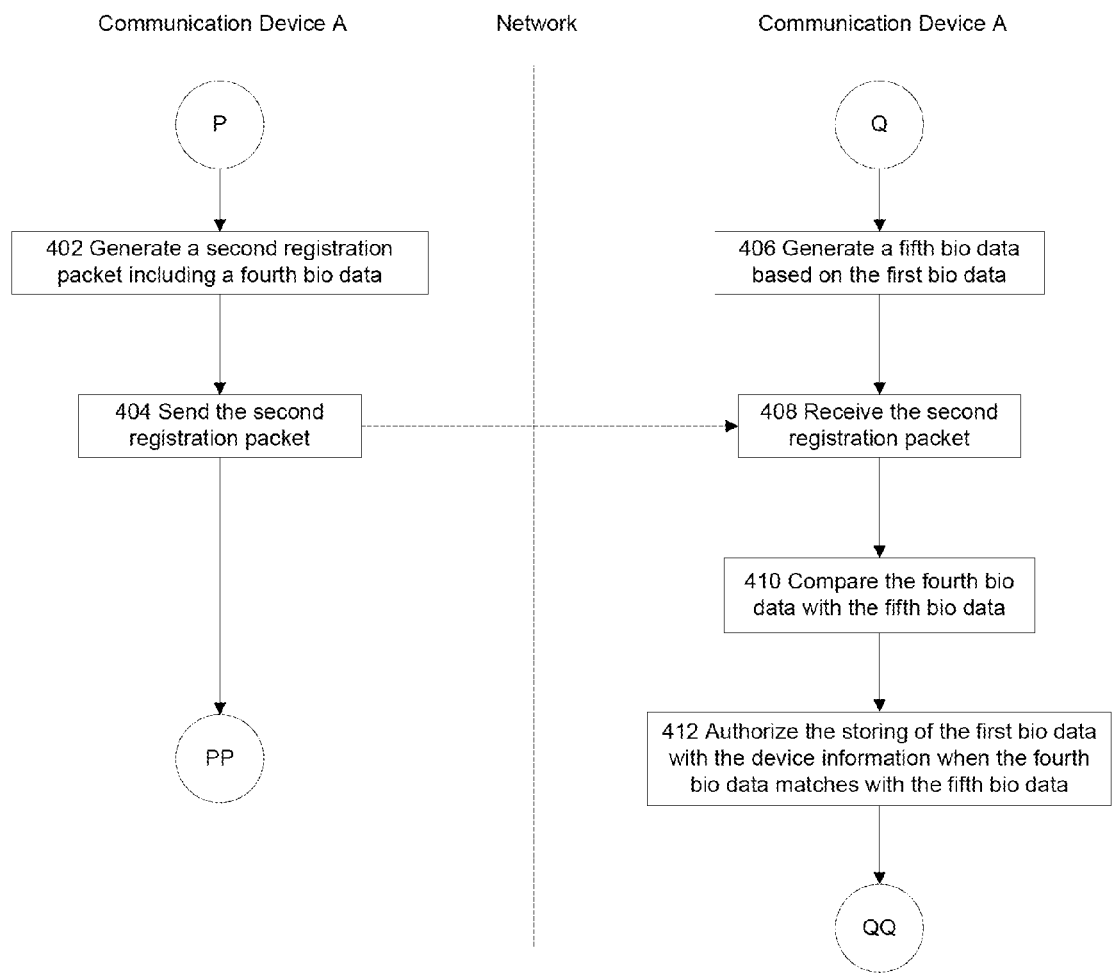
FIG. 4 is a schematic diagram illustrating a communication method according to a further embodiment of the disclosure.
Figure 5:
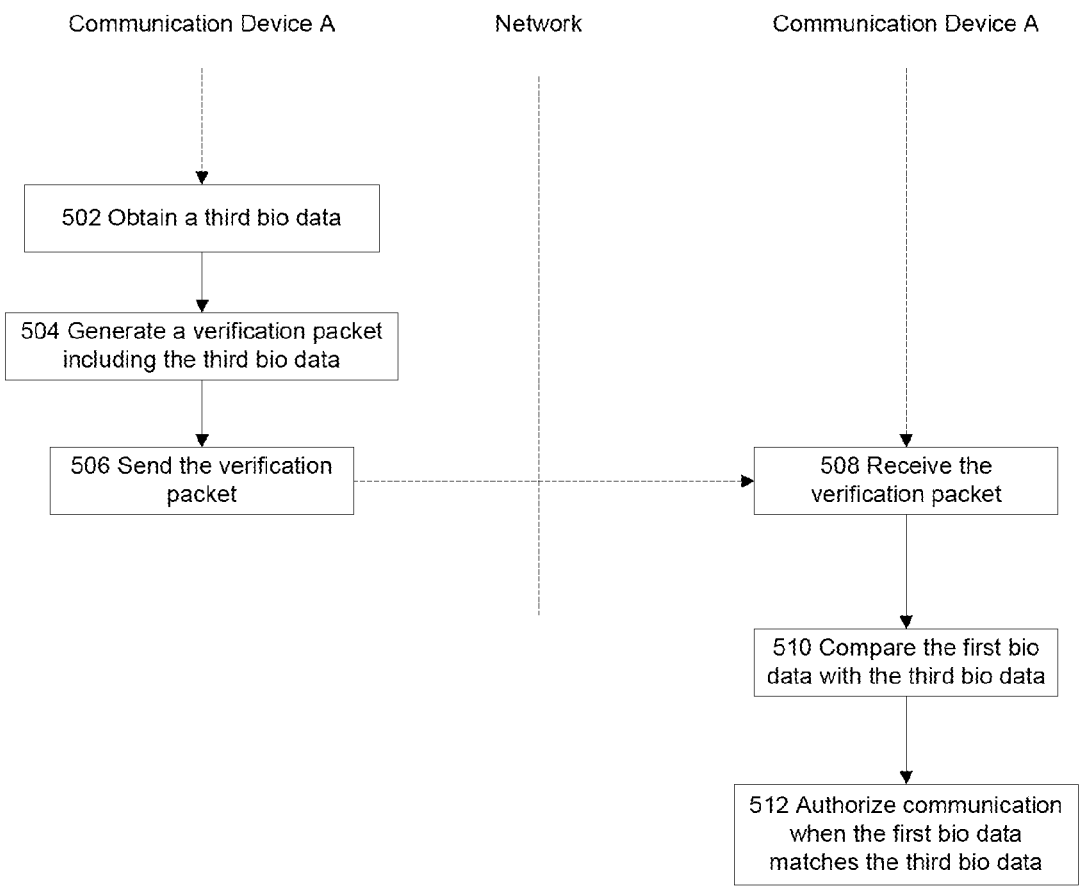
FIG. 5 is a schematic diagram illustrating a communication method according to a further embodiment of the disclosure.

As an example, the steps shown in FIG. 5 can be carried out periodically in order for the communication device B to check the identity of the user of communication device A In the methods illustrated in FIG. 3, FIG. 4 and FIG. 5, the first bio data or the second bio data includes one of bio characteristics, a biometric parameter derived from the bio characteristics, or an encoded biometric parameter. The third bio data includes one of bio characteristics, a biometric parameter derived from the bio characteristics, or an encoded biometric parameter. The fourth bio data or the fifth bio data includes one of a biometric parameter derived from a bio characteristics or an encoded biometric parameter. The bio characteristics include at least one of facial image, voice, fingerprint or iris pattern. All the bio characteristics, the biometric parameters and the encoded biometric parameters mentioned above are from a user of a communication device, for example, the user of the communication device A, and are either pre-stored in the communication device or obtained by an obtaining device such as the obtaining unit 205 at the time of communication.

As to the biometric parameter, with an image of a human face as an example of the bio characteristics, the biometric parameter derived from the bio characteristics may include a facial feature vector(s) based on the geometrical features of the face such as a Euclid distance, curvature, and angle between two appointed points on the face, a skin color feature extracted by color space transformation and skin color modeling, or the like. And, as an example, the encoded biometric parameter can be generated by encoding the biometric parameter using any kind of encoding algorithm such as Hash function.

Based on the teaching of the embodiments, those skilled in the art shall appreciate that the content data may be classified and recorded by using the registered bio data. That is, the time of the data being transmitted from different communication devices and the details of the transmitted files may be recorded. In this way, the communication device/the user of the communication device that is the first one providing a certain piece of data/file may be identified readily according to the recorded information. When a copyright dispute arises, the recorded information may be used as effective evidence to accurately identify the first provider of the disputed work.

For example, it is assumed that a video file is first sent by the communication device A then by another communication device to the communication device B. Before the communication device A sends the video file to the communication device B, the communication device A sends a registration packet to register at the communication device B. And before the other communication device sends the video file to the communication device B, the other communication device sends a registration packet to register at the communication device B as well. In this way, the communication device B records a list of communication devices/users of communication devices that have transmitted the video file. When determining which communication device/user of communication device is the first one disclosing the video file, it can be done by simply searching in the list of communication devices/users of communication devices that have transmitted the video file for the communication device/the user of communication device which corresponds to the earliest transmission time. In this example, the communication device A/the user of communication device A is the first one that transmits the video file.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A communication method, comprising:
    a first communication device generating a first registration packet including first bio data;
    the first communication device sending the first registration packet over a network to a second communication device to register the first communication device with the second communication device, wherein the second communication device is configured to store the first bio data;
    the first communication device generating a content packet having second bio data and video data; and
    the first communication device sending the content packet over the network to the second communication device, wherein:
        the second communication device is configured to record a transmission time of the content packet;
        in response to determining that the second bio data matches the first bio data, the second communication device is configured to process the video data of the content packet, including decoding the video data; and
        in response to determining that the second bio data does not match the first bio data, the second communication device is configured to discard the content packet.

2. The communication method of claim 1, further comprising:
    obtaining third bio data;
    generating a verification packet including the third bio data; and
    sending the verification packet over the network to the second communication device.

3. The communication method of claim 1, further comprising:
    generating a second registration packet including fourth bio data; and
    sending the second registration packet over the network to the second communication device.

4. The communication method of claim 1, wherein the first bio data or the second bio data includes one of bio characteristics, a biometric parameter derived from the bio characteristics, or an encoded biometric parameter.

5. The communication method of claim 2, wherein the third bio data includes one of bio characteristics, a biometric parameter derived from the bio characteristics, or an encoded biometric parameter.

6. The communication method of claim 3, wherein the fourth bio data includes one of a biometric parameter derived from bio characteristics or an encoded biometric parameter.

7. The communication method of claim 4, wherein the bio characteristics include at least one of a facial image, voice, fingerprint or iris pattern.

8. A communication device, comprising:
    a registration packet generation unit configured to generate a first registration packet including first bio data;
    a content packet generation unit configured to generate a content packet having second bio data and video data; and
    a network communication unit configured to send:
        the first registration packet over a network to a second communication device to register the first communication device with the second communication device, wherein the second communication device is configured to store the first bio data; and
        the content packet over the network to the second communication device, wherein:
            the second communication device is configured to record a transmission time of the content packet;
            in response to determining that the second bio data matches the first bio data, the second communication device is configured to process the video data of the content packet, including decoding the video data; and
            in response to determining that the second bio data does not match the first bio data, the second communication device is configured to discard the content packet.

9. The communication device of claim 8, further comprising:
    an obtaining unit configured to obtain third bio data; and
    a verification packet generation unit configured to generate a verification packet including the third bio data,
    wherein the network communication unit is further configured to send the verification packet over the network to the second communication device.

10. The communication device of claim 8, wherein the registration packet generation unit is further configured to generate a second registration packet including fourth bio data, and the network communication unit is further configured to send the second registration packet over the network to the second communication device.

11. The communication device of claim 8, wherein the first bio data or the second bio data includes one of bio characteristics, a biometric parameter derived from the bio characteristics, or an encoded biometric parameter.

12. The communication device of claim 9, wherein the third bio data includes one of bio characteristics, a biometric parameter derived from the bio characteristics, or an encoded biometric parameter.

13. The communication device of claim 10, wherein the fourth bio data includes one of a biometric parameter derived from bio characteristics or an encoded biometric parameter.

14. The communication device of claim 12, wherein the bio characteristics include at least one of a facial image, voice, fingerprint or iris pattern.

15. A computer storage medium comprising computer instructions stored thereon that are executable by a processing device of a first communication device to perform operations comprising:
    generating a first registration packet including first bio data;
    sending the first registration packet over a network to a second communication device to register the first communication device with the second communication device, wherein the second communication device is configured to store the first bio data;

generating a content packet having second bio data and video data; and sending the content packet over the network to the second communication device, wherein:

the second communication device is configured to record a transmission time of the content packet;

in response to determining that the second bio data matches the first bio data, the second communication device is configured to process the video data of the content packet, including decoding the video data; and in response to determining that the second bio data does not match the first bio data, the second communication device is configured to discard the content packet.

16. The computer storage medium of claim 15, the operations further comprising:

obtaining third bio data;

generating a verification packet including the third bio data; and sending the verification packet over the network to the second communication device.

17. The computer storage medium of claim 15, the operations further comprising:

generating a second registration packet including fourth bio data; and sending the second registration packet over the network to the second communication device.

18. The computer storage medium of claim 15, wherein the first bio data or the second bio data includes one of bio characteristics, a biometric parameter derived from the bio characteristics, or an encoded biometric parameter.

19. The computer storage medium of claim 16, wherein the third bio data includes one of bio characteristics, a biometric parameter derived from the bio characteristics, or an encoded biometric parameter.

20. The computer storage medium of claim 17, wherein the fourth bio data includes one of a biometric parameter derived from bio characteristics or an encoded biometric parameter.

* * * * *